(12) United States Patent
Jeong et al.

(10) Patent No.: US 12,496,879 B2
(45) Date of Patent: Dec. 16, 2025

(54) HEAT PUMP SYSTEM FOR A VEHICLE

(71) Applicants: HYUNDAI MOTOR COMPANY, Seoul (KR); KIA CORPORATION, Seoul (KR); HANON SYSTEMS, Daejeon (KR); DOOWON CLIMATE CONTROL CO., LTD., Asan-si (KR)

(72) Inventors: Hoyoung Jeong, Hwaseong-si (KR); Man Hee Park, Suwon-si (KR); Gwi Taek Kim, Cheonan-si (KR); Jeawan Kim, Hwaseong-si (KR); Yeonho Kim, Seoul (KR); Hochan An, Hwaseong-si (KR); Jae Yeon Kim, Hwaseong-si (KR); Yeong Jun Kim, Incheon (KR); Mingyu Lee, Asan-si (KR); Seong Wan Jeong, Cheongju-si (KR); Daehui Lee, Hwaseong-si (KR); Beom Seok Joo, Daejeon (KR); Hae Jun Lee, Daejeon (KR); Yun Jin Kim, Daejeon (KR); Chul Min Kim, Asan-si (KR)

(73) Assignees: HYUNDAI MOTOR COMPANY, Seoul (KR); KIA CORPORATION, Seoul (KR); HANON SYSTEMS, Daejeon (KR); DOOWON CLIMATE CONTROL CO., LTD., Asan-si (KR)

( * ) Notice: Subject to any disclaimer, the term of this patent is extended or adjusted under 35 U.S.C. 154(b) by 197 days.

(21) Appl. No.: 18/408,227

(22) Filed: Jan. 9, 2024

(65) Prior Publication Data
US 2025/0074157 A1    Mar. 6, 2025

(30) Foreign Application Priority Data
Aug. 29, 2023 (KR) .................. 10-2023-0113274

(51) Int. Cl.
| | |
|---|---|
| *B60H 1/32* | (2006.01) |
| *B60H 1/00* | (2006.01) |
| *H01M 10/613* | (2014.01) |
| *H01M 10/625* | (2014.01) |
| *H01M 10/63* | (2014.01) |

(Continued)

(52) U.S. Cl.
CPC ....... *B60H 1/3228* (2019.05); *B60H 1/00278* (2013.01); *B60H 1/3205* (2013.01); *H01M 10/613* (2015.04); *H01M 10/625* (2015.04); *H01M 10/63* (2015.04);

(Continued)

(58) Field of Classification Search
CPC .............. B60H 1/3228; B60H 1/00907; B60H 1/00901; B60H 1/3204; B60H 1/22; B60H 1/3227; B60H 1/32281; B60H 1/143; B60H 2001/00307; B60H 2001/00928; B60H 2001/32281; B60H 2001/3285; H01M 10/613; H01M 10/625; H01M 10/63;

(Continued)

(56) References Cited

U.S. PATENT DOCUMENTS

| | | | |
|---|---|---|---|
| 5,497,941 A * | 3/1996 | Numazawa ............. | F01P 7/162 219/205 |
| 2025/0058603 A1* | 2/2025 | Jeong ..................... | F25B 9/008 |

(Continued)

*Primary Examiner* — Marc E Norman
(74) *Attorney, Agent, or Firm* — Lempia Summerfield Katz LLC

(57) ABSTRACT

A heat pump system for a vehicle cools or heats the vehicle interior by using a natural refrigerant, and efficiently adjusts the temperature of a battery module by using a single chiller that exchanges heat between refrigerant and coolant.

20 Claims, 9 Drawing Sheets

(51) Int. Cl.
*H01M 10/6568* (2014.01)
*H01M 10/663* (2014.01)

(52) U.S. Cl.
CPC ..... *H01M 10/6568* (2015.04); *H01M 10/663* (2015.04); *H01M 2220/20* (2013.01)

(58) Field of Classification Search
CPC .......... H01M 10/6568; H01M 10/663; H01M 2220/20; F25B 9/008; F25B 41/20; F25B 41/31

See application file for complete search history.

(56) References Cited

U.S. PATENT DOCUMENTS

2025/0074139 A1* 3/2025 Jeong ................. B60H 1/00278
2025/0201965 A1* 6/2025 Wu ................... H01M 10/6569

* cited by examiner

HEAT PUMP SYSTEM FOR A VEHICLE

CROSS-REFERENCE TO RELATED APPLICATION

This application claims priority to and the benefit of Korean Patent Application No. 10-2023-0113274 filed in the Korean Intellectual Property Office on Aug. 29, 2023, the entire contents of which are incorporated herein by reference.

BACKGROUND

(a) Field of the Disclosure

The present disclosure relates to a heat pump system for a vehicle. More particularly, the present disclosure relates to a heat pump system for a vehicle capable of performing cooling or heating of a vehicle interior by using natural refrigerant, and efficiently adjusting the temperature of a battery module by using a single chiller where refrigerant and coolant exchange heat.

(b) Description of the Related Art

Generally, an air conditioning system for a vehicle includes an air conditioner unit circulating a refrigerant in order to heat or cool an interior of the vehicle.

The air conditioner unit, which is used to maintain the interior of the vehicle at an appropriate temperature regardless of a change in an external temperature, is configured to heat or cool the interior of the vehicle. This is achieved by heat-exchange using a condenser and an evaporator in a process in which a refrigerant discharged by driving of a compressor is circulated back to the compressor through the condenser, a receiver drier, an expansion valve, and the evaporator.

In other words, the air conditioner unit lowers the temperature and humidity of the interior of the vehicle by condensing a high-temperature high-pressure gas-phase refrigerant compressed from the compressor by the condenser, passing the refrigerant through the receiver drier and the expansion valve, and then evaporating the refrigerant in the evaporator in a cooling mode.

The development of an environment-friendly technology of a vehicle may be a core technology in the future of the automobile industry. Advanced car makers have focused their energy on the development of an environmentally-friendly vehicle to achieve environmental and fuel efficiency regulations.

Recently, in accordance with a continuous increase in interest in energy efficiency and environmental pollution problems, the development of an environmentally-friendly vehicle capable of substantially substituting for an internal combustion engine vehicle is required. The environmentally-friendly vehicle is classified into an electric vehicle driven using a fuel cell or electricity as a power source and a hybrid vehicle driven using an engine and a battery.

Currently, the electric vehicle is in the spotlight as a means of transportation in the future that could solve environmental problems and energy resource problems.

A heat pump system, which is an air conditioner apparatus for regulating the temperature of the vehicle interior, is applied to such an electric vehicle.

However, the refrigerant that is conventionally used in the heat pump system contains a large amount of environmentally regulated material, e.g., PFAS (Per- and Polyfluoroalkyl Substances). Therefore, there is a demand for the development of a system capable of controlling the temperature of the vehicle interior by using new refrigerants without PFAS and flammability, or natural refrigerants.

The above information disclosed in this Background section is only to enhance understanding of the background of the disclosure. Therefore, the Background section may contain information that does not form the prior art that is already known to a person of ordinary skill in the art.

SUMMARY

The present disclosure attempts to provide a heat pump system for a vehicle capable of performing cooling or heating of a vehicle interior by using natural refrigerant. Additionally, the present disclosure attempts to provide a heat pump system for a vehicle capable of efficiently adjusting the temperature of a battery module by using a single chiller where refrigerant and coolant exchange heat, to respond to environmental regulations.

In addition, the heat pump system may be capable of maximizing cooling and heating performance by operating in a super-critical cycle that is a state in which the pressure and temperature of the refrigerant are higher than the threshold pressure and temperature by applying an R744 refrigerant. The R744 refrigerant is a natural refrigerant using carbon dioxide.

A heat pump system for a vehicle may include an air conditioner unit including a compressor, a first heat-exchanger, a second heat-exchanger, a third heat-exchanger, and a fourth heat-exchanger that are connected through a refrigerant line so as to circulate the refrigerant through a refrigerant line. The system may also include a chiller connected to the refrigerant line through a first connection line. The chiller may be configured to exchange heat between the refrigerant supplied from the air conditioner unit with the coolant to adjust the temperature of the coolant. The air conditioner unit may further include a second connection line having a first end connected to the refrigerant line between the compressor and the first heat-exchanger and a second end connected to the refrigerant line between the first heat-exchanger and the second heat-exchanger. The air conditioner unit may also include a third connection line having a first end connected to the refrigerant line between the first heat-exchanger and the second heat-exchanger and a second end connected to the refrigerant line between the third heat-exchanger and the fourth heat-exchanger. The air conditioner unit may also include a first control apparatus provided in the refrigerant line between the first heat-exchanger and the second heat-exchanger, connected to the second connection line and the third connection line, respectively, and configured to control a flow of the refrigerant. The air conditioner unit may also include a second control apparatus provided in the refrigerant line between the fourth heat-exchanger and the compressor. The air conditioning unit may include a third control apparatus provided in the refrigerant line between the third heat-exchanger and the fourth heat-exchanger and configured to control a flow of the refrigerant and selectively expand the refrigerant. Additionally, the air conditioning unit may include a fourth connection line having a first end connected to the refrigerant line between the first heat-exchanger and the first control apparatus and a second end connected to the second control apparatus.

The first control apparatus may include a first valve provided in the refrigerant line between the first heat-exchanger and the second heat-exchanger and may include a second valve provided in the second connection line. The first control apparatus may also include a first expansion valve provided in the third connection line.

The second control apparatus may include a third valve provided in the refrigerant line between the fourth heat-exchanger and the compressor and may include a second expansion valve provided in the fourth connection line.

The third control apparatus may include a third expansion valve provided in the refrigerant line between the third heat-exchanger and the fourth heat-exchanger and may include a fourth expansion valve provided in the first connection line, upstream of the chiller.

A first end of the first connection line may be connected to the refrigerant line between the compressor and the fourth heat-exchanger. A second end of the first connection line may be connected to the third control apparatus.

The air conditioner unit may further include a fourth control apparatus provided in the refrigerant line between the third heat-exchanger and the third control apparatus. The air conditioner unit may also include a fifth connection line having a first end connected to the refrigerant line between the second heat-exchanger and the third heat-exchanger and a second end connected to the refrigerant line between the fourth heat-exchanger and the compressor. The air conditioner unit may also include a fifth control apparatus provided in the fifth connection line.

In a cooling mode of the vehicle interior, the refrigerant line connecting the compressor and the first heat-exchanger, and the refrigerant line connecting the first heat-exchanger and the first control apparatus, may be closed by an operation of the first control apparatus. Additionally, the refrigerant line connecting the third heat-exchanger and the third control apparatus may be opened by an operation of the fourth control apparatus. The second connection line may be opened by the operation of the first control apparatus such that the compressor and the second heat-exchanger are connected. The third connection line may be closed by the operation of the first control apparatus. The fourth connection line may be closed by an operation of the second control apparatus, and the fifth connection line may be closed by an operation of the fifth control apparatus.

In the cooling mode of the vehicle interior, when cooling of a battery module is required, the first connection line may be opened by an operation of the third control apparatus.

The third control apparatus may be configured to expand the refrigerant introduced into the first connection line and flow the expanded refrigerant to the chiller such that the battery module may be cooled by using the coolant having exchange heat with the refrigerant in the chiller. The third control apparatus may also be configured to expand the refrigerant introduced into the refrigerant line and flow the expanded refrigerant to the fourth heat-exchanger such that the expanded refrigerant may be introduced into the fourth heat-exchanger.

In a heating mode of the vehicle interior, the refrigerant line connecting the first heat-exchanger and the first control apparatus may be closed by an operation of the first control apparatus. The first connection line may also be closed by an operation of the third control apparatus and the second connection line may be closed by the operation of the first control apparatus. The third connection line may also be opened by the operation of the first control apparatus and the fourth connection line may be opened by an operation of the second control apparatus. Additionally, the fifth connection line may be opened by an operation of the fifth control apparatus and a portion of the refrigerant line connecting the second control apparatus and the compressor may be closed by the operation of the second control apparatus.

The third control apparatus may be configured to expand the refrigerant introduced from the fourth heat-exchanger and flow the expanded refrigerant to the refrigerant line.

The third control apparatus may be configured to flow the refrigerant introduced from the fourth heat-exchanger to the refrigerant line. The fourth control apparatus may be configured to expand the refrigerant introduced through the refrigerant line and introduce the expanded refrigerant into the third heat-exchanger.

The first control apparatus may be configured to expand the refrigerant introduced through the third connection line and introduce the expanded refrigerant into the second heat-exchanger.

A portion of the refrigerant among the refrigerant introduced from the third control apparatus into the refrigerant line may be introduced into the third heat-exchanger along the refrigerant line opened by an operation of the fourth control apparatus. A remaining portion of the refrigerant among the refrigerant introduced from the third control apparatus into the refrigerant line may be introduced into the second heat-exchanger along the third connection line by an operation of the first control apparatus.

The refrigerant discharged from the second heat-exchanger and the third heat-exchanger may be supplied to the compressor along the opened fifth connection line and the refrigerant line connecting the fifth connection line and the compressor.

In a hot gas heating mode of the vehicle interior, the refrigerant line connecting the first heat-exchanger and the first control apparatus may be closed by an operation of the first control apparatus. The first connection line may also be opened by an operation of the third control apparatus and the second connection line may be opened by the operation of the first control apparatus. The third connection line may also be opened by the operation of the first control apparatus and the fourth connection line may be opened by an operation of the second control apparatus. The fifth connection line may also be closed by an operation of the fifth control apparatus and the refrigerant line connecting the first control apparatus, the second heat-exchanger, the third heat-exchanger, and the fourth control apparatus may be closed by the operation of the first control apparatus and an operation of the fourth control apparatus, Additionally, a portion of the refrigerant line connecting the second control apparatus and the first connection line may be closed by the operation of the second control apparatus. Furthermore, a portion of the refrigerant line connecting the third connection line and the third control apparatus may be opened by the operation of the third control apparatus.

The first control apparatus may be configured to expand the refrigerant supplied from the compressor through the second connection line and flow the expanded refrigerant to the third connection line.

The second control apparatus may be configured to flow the refrigerant supplied from the first heat-exchanger through the fourth connection line to the fourth heat-exchanger. The third control apparatus may be configured to expand the refrigerant introduced from the fourth heat-exchanger along the refrigerant line and to flow the expanded refrigerant to the chiller through the first connection line together with the refrigerant introduced from the first control apparatus through the third connection line.

The second heat-exchanger, the third heat-exchanger, and the fourth heat-exchanger may be configured to cool or evaporate the introduced refrigerant according to selective operations of the first control apparatus, or the second control apparatus, or the third control apparatus.

The refrigerant may be R744 refrigerant formed of carbon dioxide.

An accumulator may be provided in the refrigerant line between the fourth heat-exchanger and the compressor. The first heat-exchanger, the third heat-exchanger, and the fourth heat-exchanger may be air-cooled gas coolers configured to heat-exchange the introduced refrigerant with air. The second heat-exchanger and the chiller may be water-cooled gas coolers configured to heat-exchange the introduced refrigerant with the coolant.

The second heat-exchanger may be connected to the electrical component through the first line through which the coolant circulates and the chiller may be connected to the battery module through the second line through which the coolant circulates.

As described above, by employing a heat pump system for a vehicle according to an embodiment, as cooling or heating of the vehicle interior is performed by using the natural refrigerant, it is possible to cope with environmental regulations and improve the overall marketability of the vehicle.

In addition, according to the disclosure, by applying the R744 refrigerant that is a natural refrigerant using carbon dioxide, cooling and heating performance may be maximized by being operated in a super-critical region. The super-critical region is a state in which pressure and temperature of the refrigerant are higher than threshold pressure and temperature, for cooling and heating of the vehicle interior.

In addition, according to the disclosure, streamlining and simplification of the system may be achieved by efficiently adjusting the temperature of the battery module by using the single chiller that heat-exchanges the coolant and the refrigerant according to the mode of the vehicle.

In addition, according to an embodiment, by efficiently adjusting the temperature of the battery module, the optimal performance of the battery module may be enabled and the overall travel distance of the vehicle may be increased due to the efficient management of the battery module.

In addition, according to the disclosure, in the heating mode of the vehicle interior, as the refrigerant is expanded and branched to be supplied to respective heat-exchangers, the flow of the refrigerant may be easily controlled, the ambient air heat and the waste heat of the electrical component may be smoothly recollected, and, at the same time, the chiller for cooling the battery module may be optimally designed.

In addition, according to an embodiment, it is possible to reduce manufacturing cost and weight through simplification of an entire system, and to improve space utilization.

DETAILED DESCRIPTION

Figure 1:
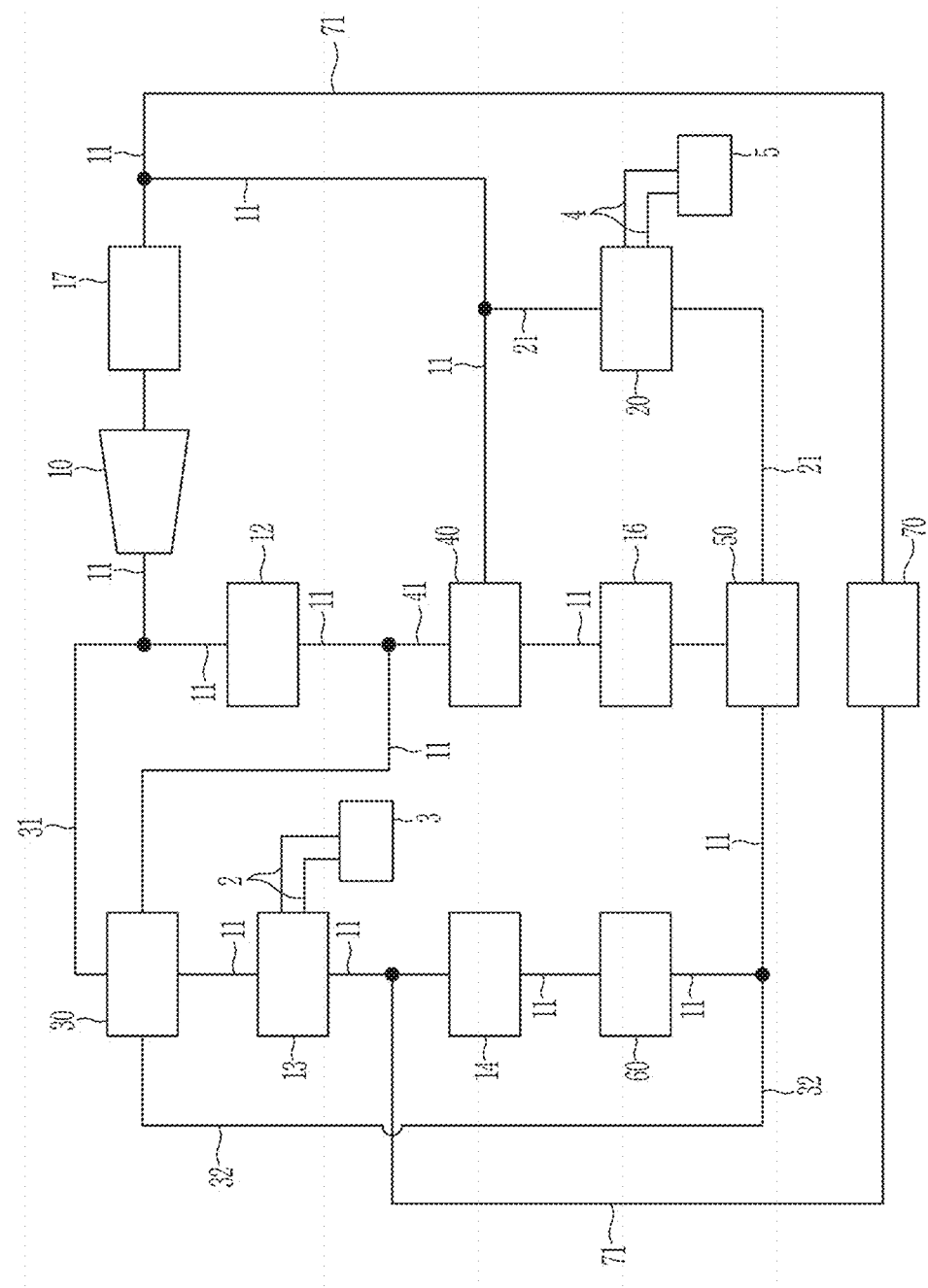
FIG. 1 is a block diagram of a heat pump system of a vehicle according to an embodiment.

Embodiments are hereinafter described in detail with reference to the accompanying drawings.

Embodiments disclosed in the present specification and the constructions depicted in the drawings are only some of the embodiments of the present disclosure, and do not cover the entire scope of the present disclosure. Therefore, it should be understood that there may be various equivalents and variations at the time of the application of this specification.

In order to clarify the present disclosure, parts that are not related to the description have been omitted, and the same elements or equivalents have been referred to with the same reference numerals throughout the specification.

Also, the size and thickness of each element are arbitrarily shown in the drawings, but the present disclosure is not necessarily limited thereto. Additionally, in the drawings, the thickness of layers, films, panels, regions, and the like, are exaggerated for clarity.

In addition, unless explicitly described to the contrary, the word "comprise" and variations such as "comprises" or "comprising," should be understood to imply the inclusion of stated elements but not the exclusion of any other elements.

Furthermore, each of the terms, such as " . . . unit," " . . . means," " . . . portions," " . . . part," and " . . . member" described in the specification, mean a unit of a comprehensive element that performs at least one function or operation.

When a component, device, element, or the like of the present disclosure is described as having a purpose or performing an operation, function, or the like, the component, device, or element should be considered herein as being "configured to" meet that purpose or perform that operation or function.

Figure 2:
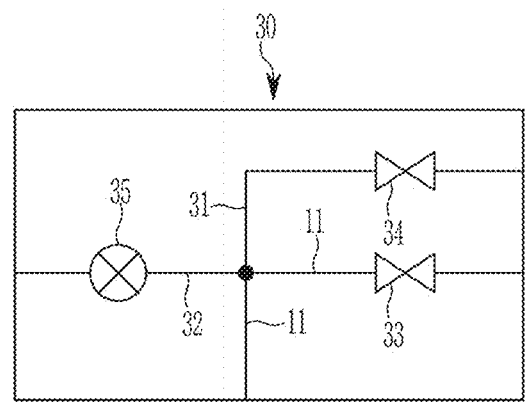
FIG. 2 is a schematic diagram of a first control apparatus of a heat pump system for a vehicle according to a first embodiment.
Figure 3:
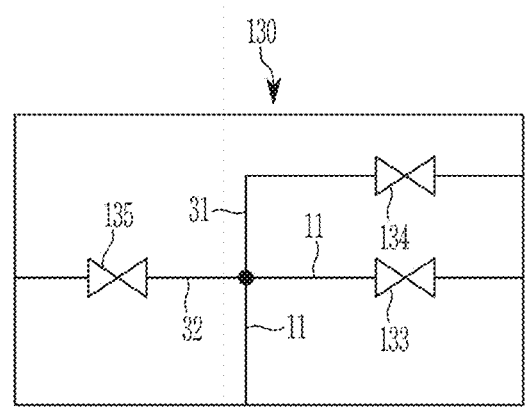
FIG. 3 is a schematic diagram of a first control apparatus of a heat pump system for a vehicle according to a second embodiment.
Figure 4:
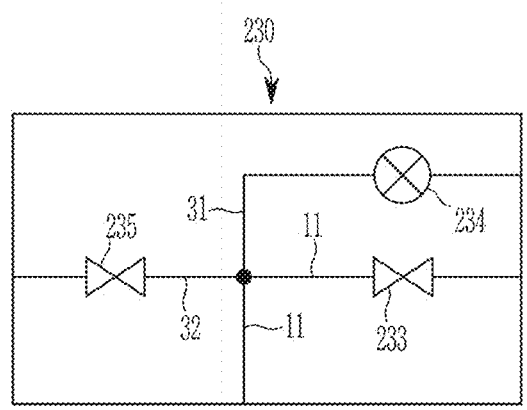
FIG. 4 is a schematic diagram of a first control apparatus of a heat pump system for a vehicle according to a third embodiment.
Figure 5:
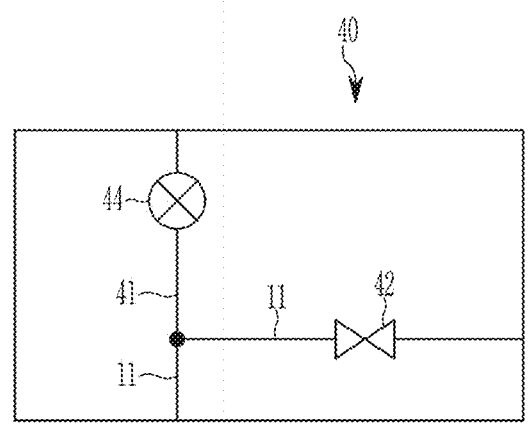
FIG. 5 is a schematic diagram of a second control apparatus of a heat pump system for a vehicle according to an embodiment.
Figure 6:
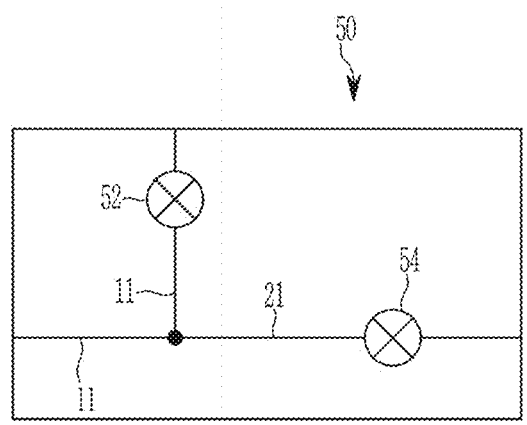
FIG. 6 is a schematic diagram of a third control apparatus of a heat pump system for a vehicle according to an embodiment.

FIG. 1 is a block diagram of a heat pump system for a vehicle according to an embodiment. FIG. 2 is a schematic diagram of a first control apparatus of a heat pump system for a vehicle according to a first embodiment. FIG. 3 is a schematic diagram of a first control apparatus of a heat pump system for a vehicle according to a second embodiment. FIG. 4 is a schematic diagram of a first control apparatus of a heat pump system for a vehicle according to a third embodiment. FIG. 5 is a schematic diagram of a second control apparatus of a heat pump system for a vehicle according to an embodiment. FIG. 6 is a schematic diagram of a third control apparatus of a heat pump system for a vehicle according to an embodiment.

A heat pump system for a vehicle according to an embodiment may perform cooling or heating of an interior of a vehicle by using natural refrigerant and efficiently adjusting a temperature of a battery module 5. This is achieved by using a single chiller 20 that exchanges heat between the refrigerant and coolant, so as to respond to environmental regulations.

The refrigerant may be an R744 refrigerant formed of carbon dioxide, of which the ozone depletion potential (ODP) is 0 and the global warming potential (GWP) is 1.

In other words, by applying the R744 refrigerant, which is a natural refrigerant using carbon dioxide, a heat pump system for a vehicle according to an embodiment may maximize cooling and heating performance, by being operated in a super-critical cycle. A super-critical cycle is a state in which the pressure and temperature of the refrigerant are higher than the threshold pressure and temperature.

For such a purpose, the heat pump system according to an embodiment may include an air conditioner unit and the chiller 20.

Referring to FIG. 1, the air conditioner unit includes a compressor 10, a first heat-exchanger 12, a second heat-exchanger 13, a third heat-exchanger 14, and a fourth heat-exchanger 16. The air conditioner unit also includes a first connection line 21, a first control apparatus 30, a second connection line 31, a third connection line 32, a second control apparatus 40, a fourth connection line 41, and a third control apparatus 50. All of the components are connected through a refrigerant line 11 so as to circulate the refrigerant through the refrigerant line 11.

First, the compressor 10 may compress and flow (e.g., transfer) the refrigerant to the refrigerant line 11, such that the refrigerant may circulate through the refrigerant line 11.

The first heat-exchanger 12 may heat-exchange (i.e., the process of exchanging heat or thermal energy) the refrigerant selectively supplied from the compressor 10 with air.

The second heat-exchanger 13 may be connected to the first heat-exchanger 12 through the refrigerant line 11. Accordingly, the refrigerant supplied to the refrigerant line 11 may pass through the second heat-exchanger 13.

The second heat-exchanger 13 may be connected to an electrical component 3 through a first line 2 through which the coolant circulates.

The electrical component 3 may include a power conversion device such as an electric power control unit (EPCU), a motor, an inverter, an on-board charger (OBC), an autonomous driving controller, or the like.

The electrical component 3 configured as such may be water-cooled by being connected to the first line 2.

In other words, the second heat-exchanger 13 may cool or evaporate the refrigerant through heat-exchange with the coolant supplied through the first line 2. The second heat-exchanger 13 may be a water-cooled gas cooler that heat-exchanges the interiorly introduced refrigerant with the coolant.

In the present embodiment, the third heat-exchanger 14 may be connected to the second heat-exchanger 13 through the refrigerant line 11. The third heat-exchanger 14 is disposed in a frontal side of the vehicle and may cool or evaporate the refrigerant through heat-exchange with the air introduced from the outside when running the vehicle.

Since the R744 refrigerant is a super-critical refrigerant and, unlike typical refrigerants, undergoes no phase change, it is described as a gas cooling refrigerant rather than a condensing refrigerant.

In addition, the fourth heat-exchanger 16 may be provided in the refrigerant line 11, between the third heat-exchanger 14 and the compressor 10.

The first heat-exchanger 12, the third heat-exchanger 13, and the fourth heat-exchanger 16 configured as such may be an air-cooled gas cooler that heat-exchanges the interiorly introduced refrigerant with air.

The first heat-exchanger 12 and the fourth heat-exchanger 16 may be provided inside a HVAC module (heating, ventilation, and air conditioning module) (not shown).

In the present embodiment, an accumulator 17 may be provided in the refrigerant line 11 between the fourth heat-exchanger 16 and the compressor 10.

The accumulator 17 only supplies gaseous refrigerant to the compressor 10, thereby improving the efficiency and durability of the compressor 10.

In addition, although not shown in the drawings, an inner heat-exchanger may be provided inside the accumulator 17.

The inner heat-exchanger may heat-exchange the refrigerant cooled in the third heat-exchanger 14 with the low temperature refrigerant discharged from the fourth heat-exchanger 16. Additionally, the inner heat-exchanger may supply the heat-exchanged refrigerant to the compressor 10 and the fourth heat-exchanger 16, respectively.

In the present embodiment, the chiller 20 may be connected to the battery module 5 through a second line 4 through which the coolant circulates. Accordingly, the coolant may be selectively circulated through the chiller 20.

The chiller 20 may heat-exchange the refrigerant supplied from the air conditioner unit with the coolant, and thereby adjust the temperature of the coolant. In other words, the chiller 20 may be a water-cooled gas cooler that heat-exchanges the interiorly introduced refrigerant with the coolant.

The chiller 20 may be connected to the refrigerant line 11 through the first connection line 21. Accordingly, the chiller 20 is provided in the second connection line 21.

A first end of the first connection line 21 is connected to the refrigerant line 11 between the compressor 10 and the fourth heat-exchanger 16. A second end of the first connection line 21 may be connected to the third control apparatus 50.

A first end of the second connection line 31 may be connected to the refrigerant line 11 between the compressor 10 and the first heat-exchanger 12. A second end of the second connection line 31 may be connected to the refrigerant line 11 between the first heat-exchanger 12 and the second heat-exchanger 13.

A first end of the third connection line 32 may be connected to the refrigerant line 11 between the first heat-exchanger 12 and the second heat-exchanger 13. A second end of the third connection line 32 may be connected to the refrigerant line 11 between the third heat-exchanger 14 and the fourth heat-exchanger 16.

In the present embodiment, the first control apparatus 30 may be provided in the refrigerant line 11 between the first heat-exchanger 12 and the second heat-exchanger 13 such that the refrigerant introduced from the compressor 10 or the first heat-exchanger 12 may be selectively supplied to the second heat-exchanger 13 or the third control apparatus 50.

The second connection line 31 and the third connection line 32 may be respectively connected to the first control apparatus 30.

The first control apparatus 30 configured as such may control the flow of the refrigerant and may selectively expand the refrigerant depending on configuration.

As shown in FIGS. 2-4, the first control apparatus 30 may be implemented as first, second, and third embodiments.

First, as shown in FIG. 2, the first control apparatus 30 according to a first embodiment may include a first valve 33, a second valve 34, and a first expansion valve 35.

First, the first valve 33 may be provided in the refrigerant line 11, between the first heat-exchanger 12 and the second heat-exchanger 13. The second valve 34 may be provided in the second connection line 31.

The first valve 33 and the second valve 34 may be a 2-way valve that controls the opening and closing of the refrigerant line 11 and the second connection line 31.

In addition, the first expansion valve 35 may be provided in the third connection line 32.

In the cooling mode of the vehicle interior, the first control apparatus 30 according to a first embodiment configured as such may flow the refrigerant supplied from the compressor 10 through the second connection line 31 to the second heat-exchanger 13.

On the other hand, in the heating mode of the vehicle interior, the first control apparatus 30 may expand the refrigerant introduced from the compressor 10 through the first heat-exchanger 12, the fourth connection line 41, the second control apparatus 40, the fourth heat-exchanger 16, the third control apparatus 50, and the third connection line 32, and flow the expanded refrigerant into the second heat-exchanger 13.

In addition, in the hot gas heating mode, the first control apparatus 30 may expand the refrigerant introduced from the compressor 10 through the second connection line 31 and may flow the expanded refrigerant to the third connection line 32.

As shown in FIG. 3, the first control apparatus 130 according to a second embodiment may include a first valve 133, a second valve 134, and a control valve 135.

First, the first valve 133 may be provided in the refrigerant line 11, between the first heat-exchanger 12 and the second heat-exchanger 13. The second valve 134 may be provided in the second connection line 31.

In addition, the control valve 135 may be provided in the third connection line 32.

The first valve 133, the second valve 134, and the control valve 135 may be 2-way valves that control the opening and closing of the refrigerant line 11, the second connection line 31, and the third connection line 32.

In the cooling mode of the vehicle interior, the first control apparatus 130 according to a second embodiment configured as such may flow the refrigerant supplied from the compressor 10 through the second connection line 31 to the second heat-exchanger 13.

On the other hand, in the heating mode of the vehicle interior, the first control apparatus 130 may flow the refrigerant introduced from the compressor 10 through the first heat-exchanger 12, the fourth connection line 41, the second control apparatus 40, the fourth heat-exchanger 16, the third control apparatus 50, and the third connection line 32 into the second heat-exchanger 13.

In addition, as shown in FIG. 4, the first control apparatus 230 according to a third embodiment may include a first valve 233, a first expansion valve 234, and a second valve 235.

The first valve 233 may be provided in the refrigerant line 11, between the first heat-exchanger 12 and the second heat-exchanger 13. The first expansion valve 234 may be provided in the second connection line 31.

In addition, the second valve 235 may be provided in the third connection line 32.

The first valve 233 and the second valve 235 may be a 2-way valve that controls the opening and closing of the refrigerant line 11 and the third connection line 32.

In the cooling mode of the vehicle interior, the first control apparatus 230 according to a third embodiment configured as such may flow the refrigerant supplied from the compressor 10 through the second connection line 31 to the second heat-exchanger 13.

On the other hand, in the heating mode of the vehicle interior, the first control apparatus 230 may flow the refrigerant introduced from the compressor 10 through the first heat-exchanger 12, the fourth connection line 41, the second control apparatus 40, the fourth heat-exchanger 16, the third control apparatus 50, and the third connection line 32 into the second heat-exchanger 13.

In addition, in the hot gas heating mode, the first control apparatus 230 may expand the refrigerant introduced from the compressor 10 through the second connection line 31 and may flow the expanded refrigerant to the third connection line 32.

In the present embodiment, the second control apparatus 40 may be provided in the refrigerant line 11, between the fourth heat-exchanger 16 and the compressor 10.

A first end of the fourth connection line 41 is connected to the refrigerant line 11 between the first heat-exchanger 12 and the first control apparatus 30. A second end of the fourth connection line 41 is connected to the second control apparatus 40.

As shown in FIG. 5, the second control apparatus 40 may include a third valve 42 and a second expansion valve 44.

First, the third valve 42 is provided in the refrigerant line 11 between the fourth heat-exchanger 16 and the compressor 10. The third valve 42 may be a 2-way valve that controls the opening and closing of the refrigerant line 11.

In addition, the second expansion valve 44 may be provided in the fourth connection line 41.

When dehumidification is required in the heating mode of the vehicle interior, the second expansion valve 44 may expand the refrigerant introduced through the fourth connection line 41 such that the expanded refrigerant may be supplied to the fourth heat-exchanger 16.

In the cooling mode of the vehicle interior, the second control apparatus 40 configured as such may flow the refrigerant supplied from the fourth heat-exchanger 16 to the compressor 10.

On the other hand, in the heating mode and the hot gas heating mode of the vehicle interior, the second control apparatus 40 may flow the refrigerant introduced from the first heat-exchanger 12 through the fourth connection line 41 into the fourth heat-exchanger 16.

In the present embodiment, the third control apparatus 50 may be provided in the refrigerant line 11, between the third heat-exchanger 14 and the fourth heat-exchanger 16. The third control apparatus 50 may control the flow of the introduced refrigerant, and selectively expand the refrigerant.

As shown in FIG. 6, the third control apparatus 50 may include a third expansion valve 52 and a fourth expansion valve 54.

First, the third expansion valve 52 is provided in the refrigerant line 11 between the third heat-exchanger 14 and the fourth heat-exchanger 16. In addition, the second expansion valve 54 may be provided in the first connection line 21, upstream of the chiller 20.

The upstream of the chiller 20 and a rear end of the chiller 20 may be set based on the flow direction of the refrigerant.

In other words, based on the direction in which the refrigerant flows along the first connection line 21, the position at which the refrigerant is introduced into the chiller 20 may be defined as the upstream of the chiller 20, and the position at which the refrigerant is discharged from the chiller 20 may be defined as the rear end of the chiller 20.

The third control apparatus 50 configured as such may selectively expand the refrigerant introduced through the refrigerant line 11.

In addition, the third control apparatus 50 may supply the refrigerant to the fourth heat-exchanger 16, the chiller 20, or a combination thereof through the refrigerant line 11 and the first connection line 21.

In other words, the third control apparatus 50 may selectively expand the refrigerant while controlling the flow of the refrigerant.

Accordingly, the chiller 20 may heat-exchange the coolant selectively introduced through the second line 4 with the refrigerant selectively supplied from the air conditioner unit, and thereby may adjust the temperature of the coolant.

The coolant heat-exchanged in the chiller 20 may circulate the battery module 5 through the second line 4.

A water pump (not shown) may be provided in the first line 2 and the second line 4.

In other words, the coolant may circulate the first line 2 and the second line 4 according to an operation of each water pump (not shown).

Accordingly, the coolant heat-exchanged with the refrigerant at the second heat-exchanger 13 and the chiller 20 may adjust the temperatures of the electrical component 3 and the battery module 5 by being selectively supplied to the electrical component 3 and the battery module 5.

Depending on the cooling mode or heating mode of the vehicle interior, the third control apparatus 50 may selectively expand the refrigerant, and flow the expanded refrigerant to the chiller 20 through the first connection line 21.

In addition, the third control apparatus 50 may expand the introduced refrigerant and may supply the expanded refrigerant to the chiller 20 through the first connection line 21. To the contrary, the third control apparatus 50 may close the first connection line 21 such that the refrigerant may not be supplied to the chiller 20.

In more detail, when the battery module 5 is cooled by using the coolant having heat-exchanged with the refrigerant in the chiller 20, the third control apparatus 50 may open the first connection line 21.

Simultaneously, the third control apparatus 50 may expand the introduced refrigerant. The expanded refrigerant may flow to the chiller 20 through the first connection line 21.

In other words, when the battery module 5 is cooled in the cooling mode of the vehicle interior, the third control apparatus 50 may expand the refrigerant discharged from the third heat-exchanger 14 to decrease its temperature and flow the expanded refrigerant to the chiller 20, thereby further decreasing the temperature of the coolant passing through the interior of the chiller 20.

Accordingly, the battery module 5 may be cooled more efficiently, by receiving the flowing cooled coolant passing through the chiller 20.

In addition, in the cooling mode of the vehicle interior, the third control apparatus 50 may expand the introduced refrigerant and may flow the expanded refrigerant to the fourth heat-exchanger 16 through the refrigerant line 11.

To the contrary, in the heating mode of the vehicle interior, the third control apparatus 50 may expand the refrigerant introduced from the fourth heat-exchanger 16. Thereafter, the third control apparatus 50 may flow the expanded refrigerant to the second heat-exchanger 13 or the third heat-exchanger 14.

In the heating mode of the vehicle interior, the third control apparatus 50 may flow the refrigerant introduced from the fourth heat-exchanger 16 without expansion according to a selective operation of a fourth control apparatus 60 described below.

In the hot gas heating mode, the third control apparatus 50 may expand the refrigerant introduced from the fourth heat-exchanger 16 and may supply it from the first connection line 21 to the chiller 20 together with the refrigerant introduced through the third connection line 32.

In the present embodiment, the air conditioner unit may further include the fourth control apparatus 60, a fifth control apparatus 70, and a fifth connection line 71.

First, the fourth control apparatus 60 may be provided in the refrigerant line 11, between the third heat-exchanger 14 and the third control apparatus 50.

The fourth control apparatus 60 may be configured as one of a 2-way valve that controls the opening and closing of the refrigerant line 11, or an expansion valve that controls the opening and closing of the refrigerant line 11 and selectively expands the refrigerant.

When the fourth control apparatus 60 is a 2-way valve, in the cooling mode of the vehicle interior, the fourth control apparatus 60 may open the refrigerant line 11 such that the refrigerant having passed through the third heat-exchanger 14 may be supplied to the third control apparatus 50.

To the contrary, in the heating mode of the vehicle interior, the fourth control apparatus 60 may open the refrigerant line 11 connected to the third heat-exchanger 14 such that the refrigerant supplied from the third control apparatus 50 may be introduced to the third heat-exchanger 14.

When the fourth control apparatus 60 is an expansion valve, in the cooling mode of the vehicle interior, the fourth control apparatus 60 may open the refrigerant line 11 such that the refrigerant having passed through the third heat-exchanger 14 may be supplied to the third control apparatus 50 in an unexpanded state.

To the contrary, in the heating mode of the vehicle interior, the fourth control apparatus 60 may open the refrigerant line 11 connected to the third heat-exchanger 14 and at the same time, expand the refrigerant such that the refrigerant supplied from the third control apparatus 50 may be introduced to the third heat-exchanger 14 in an expanded state.

The third control apparatus 50 may flow the refrigerant introduced from the fourth heat-exchanger 16 to the refrigerant line 11 connected to the fourth control apparatus 60, in an unexpanded state.

In the present embodiment, the fifth control apparatus 70 may be provided in the fifth connection line 71.

A first end of the fifth connection line 71 is connected to the refrigerant line 11 between the second heat-exchanger 13 and the third heat-exchanger 14. A second end of the fifth connection line 71 is connected to the refrigerant line 11 between the fourth heat-exchanger 16 and the compressor 10.

In other words, the fifth control apparatus 70 is provided in the fifth connection line 71 so as to selectively open and close the fifth connection line 71. The fifth control apparatus 70 may be a 2-way valve that controls the opening and closing of the fifth connection line 71.

The fifth control apparatus 70 configured as such may selectively open and close the fifth connection line 71, depending on the cooling mode or heating mode of the vehicle interior.

In more detail, in the cooling mode and the hot gas heating mode of the vehicle interior, the fifth control apparatus 70 may close the fifth connection line 71.

To the contrary, in the heating mode of the vehicle interior, the fifth control apparatus 70 may open the fifth connection line 71.

In other words, in the heating mode of the vehicle interior, the fifth connection line 71 is opened through an operation of the fifth control apparatus 70 such that the refrigerant discharged from the second heat-exchanger 13 and the third heat-exchanger 14 may flow.

In the heat pump system configured as such, the second heat-exchanger 13, the third heat-exchanger 14, and the fourth heat-exchanger 16 may cool or evaporate the introduced refrigerant according to the selective operation of the third control apparatus 50.

In other words, the second heat-exchanger 13, the third heat-exchanger 14, and the fourth heat-exchanger 16 may evaporate the refrigerant when the expanded refrigerant is introduced and cool the refrigerant when the unexpanded refrigerant is introduced.

Hereinafter, an operation and action of a heat pump system for a vehicle according to an embodiment configured as described above is described in detail with reference to FIGS. 7-9.

First, in the cooling mode of the vehicle interior, the operation for cooling the battery module 5 is described with reference to FIG. 7.

Figure 7:
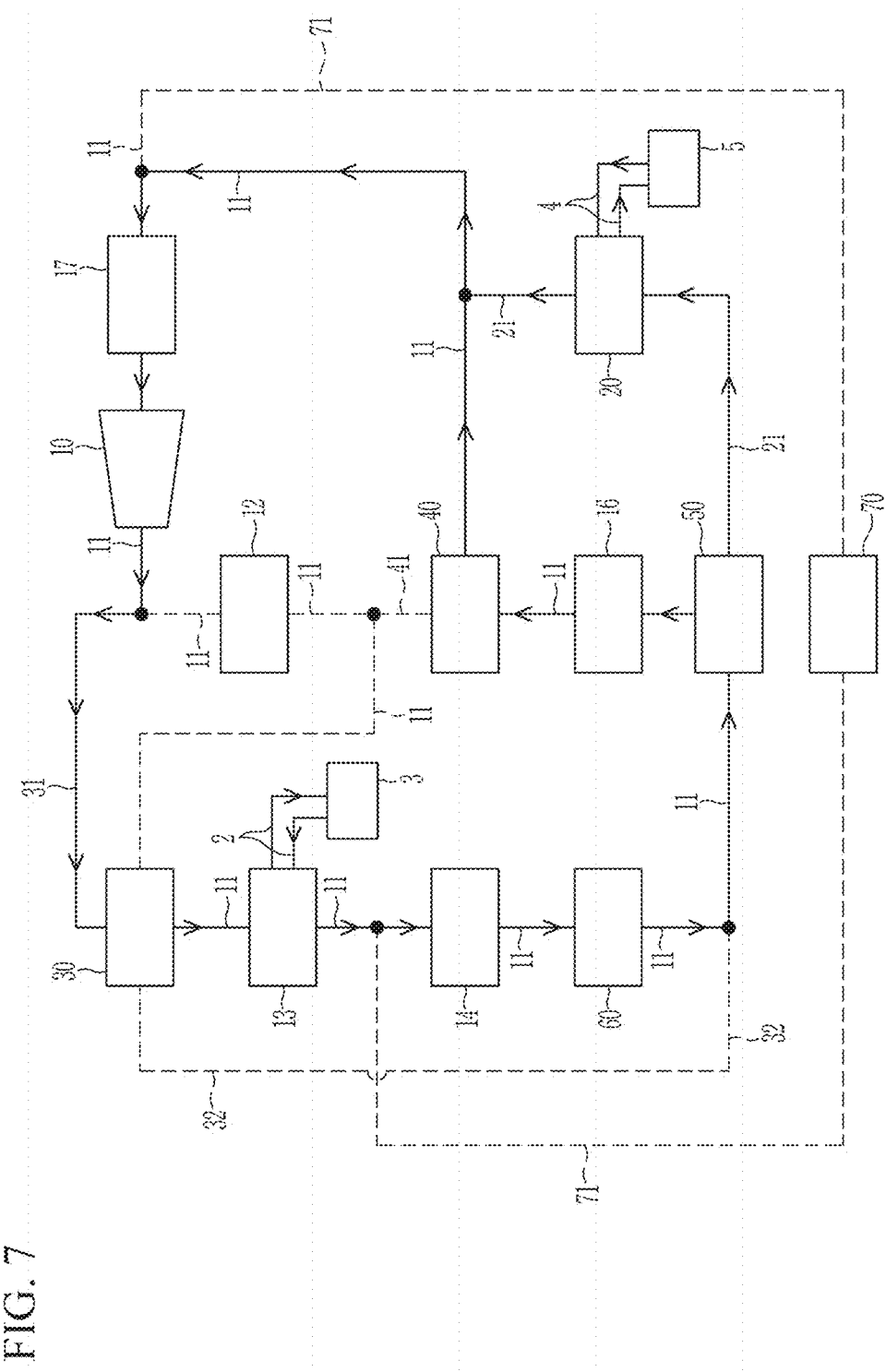
FIG. 7 is an operation diagram for cooling a battery module in a cooling mode of a vehicle interior, in a heat pump system for a vehicle according to an embodiment.

FIG. 7 is an operation diagram for cooling a battery module in a cooling mode of the vehicle interior, in a heat pump system for a vehicle according to an embodiment.

Referring to FIG. 7, the coolant may circulate through the first line 2 by an operation of a water pump (not shown).

Accordingly, the coolant having passed through the electrical component 3 may be supplied to the second heat-exchanger 13 along the first line 2.

Respective components in the air conditioner unit operate for cooling of the vehicle interior. Accordingly, the refrigerant is circulated along the refrigerant line 11.

The refrigerant line 11 connecting the compressor 10 and the first heat-exchanger 12 is closed by an operation of the first control apparatus 30. At the same time, the refrigerant line 11 connecting the first heat-exchanger 12 and the first control apparatus 30 is closed by the operation of the first control apparatus 30.

In addition, the second connection line 31 is opened by the operation of the first control apparatus 30 such that the compressor 10 and the second heat-exchanger 13 are connected.

Accordingly, the refrigerant supplied from the compressor 10 may be supplied to the second heat-exchanger 13 along the second connection line 31.

Simultaneously, the third connection line 32 may be closed by the operation of the first control apparatus 30.

The refrigerant line 11 connecting the third heat-exchanger 14 and the third control apparatus 50 may be opened by an operation of the fourth control apparatus 60.

In addition, the fourth connection line 41 is closed by an operation of the second control apparatus 40. In addition, the fifth connection line 71 is closed by the operation of the fifth control apparatus 70.

The first connection line 21 is opened by the operation of the third control apparatus 50, for cooling of the battery module 5.

The coolant may circulate through the second line 4 by the operation of a water pump (not shown). Accordingly, the coolant having passed through the battery module 5 may be supplied to the chiller 20 along the second line 4.

The third control apparatus 50 may expand the refrigerant for cooling the battery module 5 by using the coolant having heat-exchanged with the refrigerant in the chiller 20 and may flow the expanded refrigerant to the first connection line 21. The expanded refrigerant may be introduced into the chiller 20 along the first connection line 21.

Therefore, the coolant having passed through the chiller 20 may be cooled through heat-exchange with the expanded refrigerant supplied to the chiller 20.

In other words, the coolant passing through the chiller 20 is cooled through heat-exchange with the expanded refrigerant supplied to the chiller 20. The coolant cooled in the chiller 20 is supplied to the battery module 5 along the second line 4. Accordingly, the battery module 5 may be efficiently cooled by the coolant cooled at the chiller 20.

The refrigerant supplied from the compressor 10 may sequentially pass through the second heat-exchanger 13 and the third heat-exchanger 14 along the second connection line 31 connected to the refrigerant line 11.

The second heat-exchanger 13 may primarily cool the refrigerant by using the coolant flowing along the first line 2. In addition, the third heat-exchanger 14 may secondarily cool the refrigerant introduced from the second heat-exchanger 13 through heat-exchange with the air.

The refrigerant having sequentially passed through the second heat-exchanger 13 and the third heat-exchanger 14 is introduced into the third control apparatus 50 along the refrigerant line 11.

The third control apparatus 50 may expand the refrigerant introduced into the refrigerant line 11 and flow the expanded refrigerant to the fourth heat-exchanger 16, such that the expanded refrigerant may flow into the fourth heat-exchanger 16.

In other words, the third control apparatus 50 may expand the refrigerant having passed through the third heat-exchanger 14 and may flow some, i.e., a portion of the refrigerant among the expanded refrigerant to the first connection line 21 and some refrigerant among the expanded refrigerant to the fourth heat-exchanger 16, such that the expanded refrigerant may be supplied to the fourth heat-exchanger 16 and the chiller 20.

Therefore, the refrigerant expanded through the operation of the third control apparatus 50 to be in the state of low temperature and low pressure flows to the chiller 20 through the first connection line 21.

Then, the refrigerant introduced to the chiller 20 heat-exchanges with the coolant supplied through the second line 4, passes through the accumulator 17 along the refrigerant line 11 connected to the first connection line 21, and then flows to the compressor 10.

A remaining portion of the refrigerant among the refrigerant expanded in the third control apparatus 50 may flow along the refrigerant line 11, so as to cool the vehicle interior. Accordingly, the refrigerant sequentially passes through the fourth heat-exchanger 16, the second control apparatus 40, the accumulator 17, and the compressor 10.

Air introduced into the HVAC module is cooled by the low temperature refrigerant introduced into the fourth heat-exchanger 16 while passing through the fourth heat-exchanger 16.

The cooled air may cool the vehicle interior by passing through the first heat-exchanger 12 that is not supplied with the refrigerant and being directly introduced into the vehicle interior.

The refrigerant having an increased cooled level while sequentially passing through the second heat-exchanger 13 and the third heat-exchanger 14 is expanded and supplied to the fourth heat-exchanger 16, and therefore, the refrigerant may be evaporated at a lower temperature.

In other words, in the present embodiment, the second heat-exchanger 13 cools the refrigerant through heat-exchange with the coolant, and the third heat-exchanger 14 cools the refrigerant through heat-exchange with air, through which the R744 refrigerant formed of carbon dioxide may be more efficiently cooled. As a result, the configuration provides an advantage to the formation of sub-cooling of the refrigerant.

In addition, as the refrigerant formed with sub-cooling is evaporated at a lower temperature at the fourth heat-exchanger 16, the temperature of the air passing through the fourth heat-exchanger 16 may be further decreased, thereby improving the cooling performance and efficiency.

While repeatedly performing the above-described processes, the refrigerant may cool the vehicle interior in the cooling mode of the vehicle interior and, at the same time, may cool the coolant through heat-exchange while passing through the chiller 20.

The low temperature coolant cooled at the chiller 20 flows to the battery module 5 through the second line 4. Accordingly, the battery module 5 may be efficiently cooled by the supplied low temperature coolant.

In the present embodiment, the operation in the heating mode of the vehicle interior is described with reference to FIG. 8.

Figure 8:
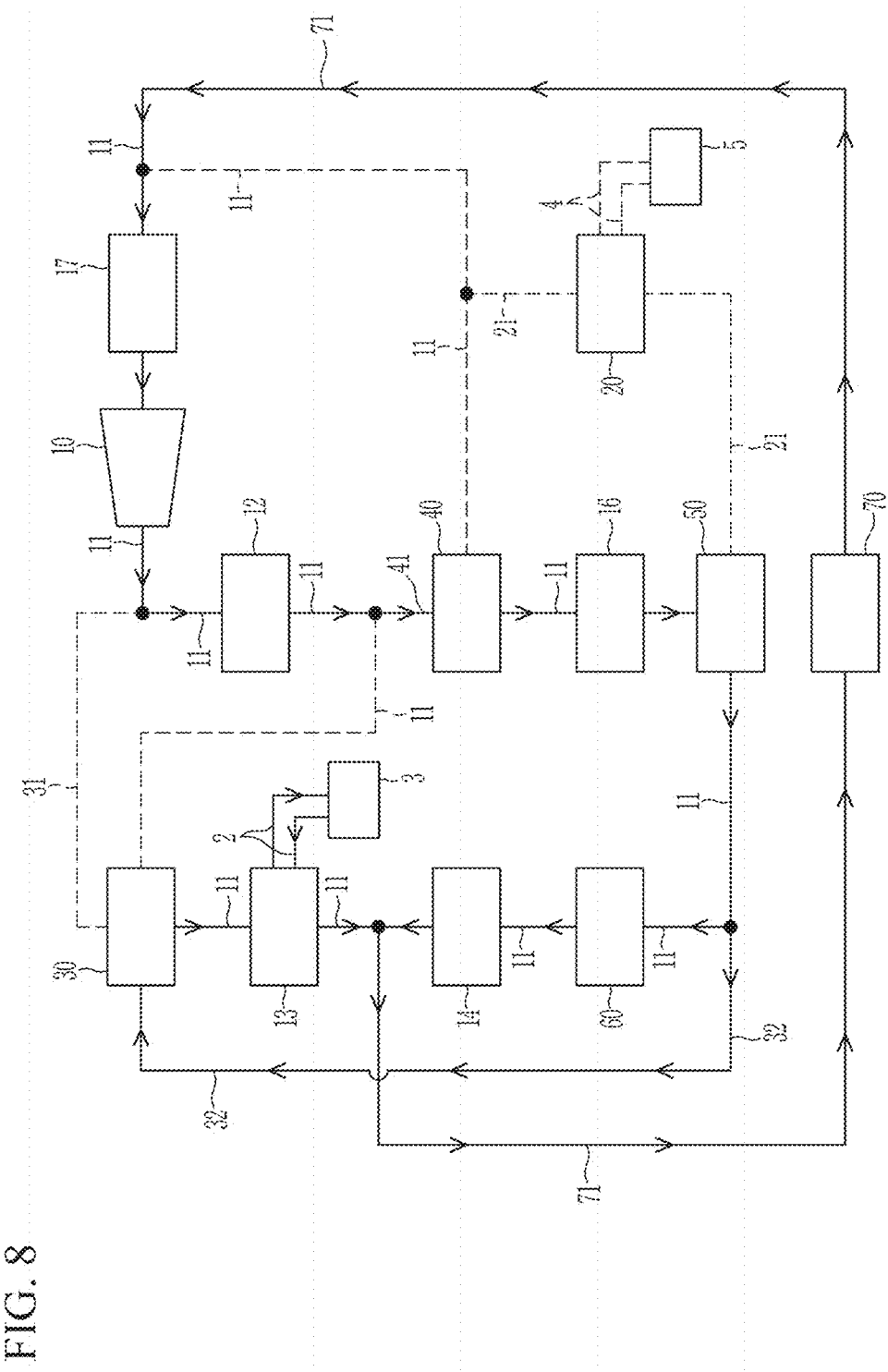
FIG. 8 is an operation diagram according to a heating mode of a vehicle interior, in a heat pump system for a vehicle according to an embodiment.

FIG. 8 is an operation diagram of a heat pump system for a vehicle according to an embodiment according to a heating mode of the vehicle interior.

Referring to FIG. 8, the coolant may circulate through the first line 2 by the operation of a water pump (not shown).

Accordingly, the coolant having passed through the electrical component 3 may be supplied to the second heat-exchanger 13 along the first line 2.

Respective components in the air conditioner unit operate to heat the vehicle interior. Accordingly, the refrigerant is circulated along the refrigerant line 11.

The refrigerant line 11 connecting the first heat-exchanger 12 and the first control apparatus 30 is closed by the operation of the first control apparatus 30.

The first connection line 21 is closed by the operation of the third control apparatus 50. The second connection line 31 is closed by the operation of the first control apparatus 30.

The third connection line 32 is opened by the operation of the first control apparatus 30.

The fourth connection line 41 is opened by the operation of the second control apparatus 40. At the same time, a portion of the refrigerant line 11 connecting the second control apparatus 40 and the compressor 10 may be closed by the operation of the second control apparatus 40.

In addition, the fifth connection line 71 may be opened by the operation of the fifth control apparatus 70.

Accordingly, the refrigerant discharged from the compressor 10 is introduced into the first heat-exchanger 12 along the refrigerant line 11.

Then, the refrigerant discharged from the first heat-exchanger 12 is introduced into the second control apparatus 40 along the fourth connection line 41 opened by the operation of the second control apparatus 40.

The refrigerant discharged from the second control apparatus 40 is introduced into the fourth heat-exchanger 16 along the refrigerant line 11 connected to the fourth heat-exchanger 16.

Accordingly, the first heat-exchanger 12 and the fourth heat-exchanger 16 may cool the refrigerant by using the air introduced into the HVAC module.

The refrigerant having passed through the fourth heat-exchanger 16 is introduced into the third control apparatus 50 along the refrigerant line 11.

The third control apparatus 50 may expand the refrigerant introduced from the fourth heat-exchanger 16 and may flow the expanded refrigerant to the refrigerant line 11.

Some refrigerant among the refrigerant introduced from the third control apparatus 50 into the refrigerant line 11 may be introduced into the third heat-exchanger 14 along the refrigerant line 11 opened by the operation of the fourth control apparatus 60.

In this case, the fourth control apparatus 60 may be a 2-way valve for selectively opening and closing the refrigerant line 11 connected to the third heat-exchanger 14.

The third heat-exchanger 14 may recollect heat from the ambient air while evaporating the expanded refrigerant through heat-exchange with the air.

In addition, the refrigerant having passed through the third heat-exchanger 14 may flow along the opened fifth connection line 71.

Simultaneously, a remaining refrigerant among the refrigerant introduced from the third control apparatus 50 into the refrigerant line 11 may flow to the first control apparatus 30 along the third connection line 32, and then flow to the second heat-exchanger 13.

Accordingly, the second heat-exchanger 13 may evaporate the expanded refrigerant through heat-exchange with the coolant supplied through the first line) 2. The second heat-exchanger 13 may recollect waste heat from the heated coolant coming from the electrical component 3.

The refrigerant having passed through the second heat-exchanger 13 may flow along the opened fifth connection line 71.

In other words, the refrigerant discharged from the second heat-exchanger 13 and the third heat-exchanger 14 may flow along the opened fifth connection line 71 and the refrigerant line 11 connecting the fifth connection line 71 and the compressor 10. Additionally, the refrigerant may be supplied to the compressor 10 by passing through the accumulator 17.

The first heat-exchanger 12 and the fourth heat-exchanger 16 may cool the refrigerant by heat-exchanging the air introduced into the HVAC module 12 with the refrigerant. The refrigerant primarily cooled at the first heat-exchanger 12 may be further cooled at the fourth heat-exchanger 16.

In other words, when the refrigerant having passed through the first heat-exchanger 12 is supplied to the fourth heat-exchanger 16 by the operation of the second control apparatus 40, the fourth heat-exchanger 16 may cool the refrigerant by heat-exchanging the air introduced into the HVAC module with the refrigerant.

The refrigerant having passed through the fourth heat-exchanger 16 is introduced into the third control apparatus 50 along the refrigerant line 11. As described above, the third control apparatus 50 may expand the refrigerant and supply the expanded refrigerant to the second heat-exchanger 13 and the third heat-exchanger 14, respectively.

The refrigerant discharged from the third control apparatus 50 may be branched through the third connection line 32 and supplied to the second heat-exchanger 13 and the third heat-exchanger 14, respectively.

Accordingly, the second heat-exchanger 13 may cool the supplied refrigerant through heat-exchange with the coolant, and at the same time, the third heat-exchanger 14 may cool the supplied refrigerant through heat-exchange with the air.

While repeatedly performing such an operation, the second heat-exchanger 13 and the third heat-exchanger 14 may recollect the waste heat of the electrical component 3 and the ambient air.

In other words, as the recollected waste heat of the electrical component 3 and the ambient air heat are used to increase the temperature of the refrigerant, the heat pump system may reduce the power consumption of the compressor 10 and improve the heating efficiency.

The refrigerant discharged from the second heat-exchanger 13 and the third heat-exchanger 14 is supplied to the fifth control apparatus 70 along the opened fifth connection line 71.

Then, the refrigerant is supplied from the fifth control apparatus 70 to the accumulator 17 along the refrigerant line 11 connected to the fifth connection line 71.

The refrigerant having passed through the accumulator 17 may be supplied to the compressor 10.

In addition, the refrigerant compressed by the compressor 10 to the high temperature and pressure state is introduced back into the first heat-exchanger 12 along the refrigerant line 11.

As described above, the refrigerant supplied to the first heat-exchanger 12 and the fourth heat-exchanger 16 may increase the temperature of the air introduced into the HVAC module.

Accordingly, the air introduced from the outside may be converted to a high temperature state while sequentially passing through the fourth heat-exchanger 16 and the first heat-exchanger 12, and flow into the vehicle interior, thereby achieving the heating of the vehicle interior.

When dehumidification is required while the heating mode of the vehicle interior is being operated, the second control apparatus 40 may expand the refrigerant having passed through the first heat-exchanger 12 and supply the expanded refrigerant to the fourth heat-exchanger 16.

Then, air introduced into the HVAC module is dehumidified by the refrigerant in the low temperature state introduced into the fourth heat-exchanger 16 while passing through the fourth heat-exchanger 16. Thereafter, as the air may be converted to a high temperature state while passing through the first heat-exchanger 12 and flow into the vehicle interior, the vehicle interior may be smoothly heated and dehumidified.

In an embodiment, as described above, the heating mode of the vehicle interior is described with respect to the case that the fourth control apparatus 60 is a 2-way valve, but it is not limited thereto.

Hereinafter, as another embodiment, when the fourth control apparatus 60 is an expansion valve, the operation in the heating mode of the vehicle interior is described with reference to FIG. 8.

In other words, as another embodiment, when the fourth control apparatus 60 is an expansion valve, as shown in FIG. 8, the connection structure of the refrigerant line 11 and the first to fifth connection lines 21, 31, 32, 41, and 71 is the same as the above-mentioned embodiment.

The coolant may circulate through the first line 2 by the operation of a water pump (not shown).

Accordingly, the coolant having passed through the electrical component 3 may be supplied to the second heat-exchanger 13 along the first line 2.

Respective components in the air conditioner unit operate for heating of the vehicle interior. Accordingly, the refrigerant is circulated along the refrigerant line 11.

The refrigerant line 11 connecting the first heat-exchanger 12 and the first control apparatus 30 is closed by the operation of the first control apparatus 30.

The first connection line 21 is closed by the operation of the third control apparatus 50. The second connection line 31 is closed by the operation of the first control apparatus 30.

The third connection line 32 is opened by the operation of the first control apparatus 30.

The fourth connection line 41 is opened by the operation of the second control apparatus 40. At the same time, a portion of the refrigerant line 11 connecting the second control apparatus 40 and the compressor 10 may be closed by the operation of the second control apparatus 40.

In addition, the fifth connection line 71 may be opened by the operation of the fifth control apparatus 70.

Accordingly, the refrigerant discharged from the compressor 10 is introduced into the first heat-exchanger 12 along the refrigerant line 11.

Then, the refrigerant discharged from the first heat-exchanger 12 is introduced into the second control apparatus 40 along the fourth connection line 41 opened by the operation of the second control apparatus 40.

The refrigerant discharged from the second control apparatus 40 is introduced into the fourth heat-exchanger 16 along the refrigerant line 11 connected to the fourth heat-exchanger 16.

Accordingly, the first heat-exchanger 12 and the fourth heat-exchanger 16 may cool the refrigerant by using the air introduced into the HVAC module.

The refrigerant having passed through the fourth heat-exchanger 16 is introduced into the third control apparatus 50 along the refrigerant line 11.

The third control apparatus 50 may flow the refrigerant introduced from the fourth heat-exchanger 16 to the refrigerant line 11 without expansion.

Some refrigerant among the refrigerant introduced from the third control apparatus 50 into the refrigerant line 11 may be introduced into the third heat-exchanger 14 along the refrigerant line 11 opened by the operation of the fourth control apparatus 60.

The fourth control apparatus 60 may expand the refrigerant introduced through the refrigerant line 11 and flow the expanded refrigerant to the third heat-exchanger 14.

Accordingly, the third heat-exchanger 14 may recollect heat from the ambient air while evaporating the expanded refrigerant through heat-exchange with the air.

In addition, the refrigerant having passed through the third heat-exchanger 14 may flow along the opened fifth connection line 71.

Simultaneously, a remaining refrigerant among the refrigerant introduced from the third control apparatus 50 into the refrigerant line 11 may flow to the first control apparatus 30 along the third connection line 32, and then flow to the second heat-exchanger 13.

The first control apparatus 30 may expand the refrigerant introduced through the third connection line 32 and flow the expanded refrigerant to the second heat-exchanger 13.

Accordingly, the second heat-exchanger 13 may evaporate the expanded refrigerant through heat-exchange with the coolant supplied through the first line 2. The second heat-exchanger 13 may recollect waste heat of the electrical component 3 from the heat collected from the coolant leaving the electrical component 3.

The refrigerant having passed through the second heat-exchanger 13 may flow along the opened fifth connection line 71.

In other words, the refrigerant discharged from the second heat-exchanger 13 and the third heat-exchanger 14 may flow along the opened fifth connection line 71 and the refrigerant line 11 connecting the fifth connection line 71 and the compressor 10. The refrigerant may be supplied to the compressor 10 by passing through and the accumulator 17.

The first heat-exchanger 12 and the fourth heat-exchanger 16 may cool the refrigerant by heat-exchanging the air introduced into the HVAC module 12 with the refrigerant. The refrigerant primarily cooled at the first heat-exchanger 12 may be further cooled at the fourth heat-exchanger 16.

In other words, when the refrigerant having passed through the first heat-exchanger 12 is supplied to the fourth heat-exchanger 16 by the operation of the second control apparatus 40, the fourth heat-exchanger 16 may cool the refrigerant by heat-exchanging the air introduced into the HVAC module with the refrigerant.

While repeatedly performing such an operation, the second heat-exchanger 13 and the third heat-exchanger 14 may recollect the waste heat of the electrical component 3 and the ambient air heat.

In other words, as the recollected waste heat of the electrical component 3 and ambient air heat are used to increase the temperature of the refrigerant, the heat pump system may reduce the power consumption of the compressor 10 and improve the heating efficiency.

The refrigerant discharged from the second heat-exchanger 13 and the third heat-exchanger 14 is supplied to the fifth control apparatus 70 along the opened fifth connection line 71.

Then, the refrigerant is supplied from the fifth control apparatus 70 to the accumulator 17 along the refrigerant line 11 connected to the fifth connection line 71.

The refrigerant having passed through the accumulator 17 may be supplied to the compressor 10.

In addition, the refrigerant compressed by the compressor 10 to the high temperature and pressure state is introduced back into the first heat-exchanger 12 along the refrigerant line 11.

As described above, the refrigerant supplied to the first heat-exchanger 12 and the fourth heat-exchanger 16 may increase the temperature of the air introduced into the HVAC module.

Accordingly, the air introduced from the outside may be converted to a high temperature state while sequentially passing through the fourth heat-exchanger 16 and the first heat-exchanger 12, and flow into the vehicle interior, thereby achieving the heating of the vehicle interior.

When dehumidification is required while the heating mode of the vehicle interior is being operated, the second control apparatus 40 may expand the refrigerant having passed through the first heat-exchanger 12 and supply the expanded refrigerant to the fourth heat-exchanger 16.

Then, air introduced into the HVAC module is dehumidified by the refrigerant in the low temperature state introduced into the fourth heat-exchanger 16 while passing through the fourth heat-exchanger 16. Thereafter, as the air may be converted to a high temperature state while passing through the first heat-exchanger 12 and flow into the vehicle interior, the vehicle interior may be smoothly heated and dehumidified.

In addition, the operation in the hot gas heating mode is described with reference to FIG. 9.

Figure 9:
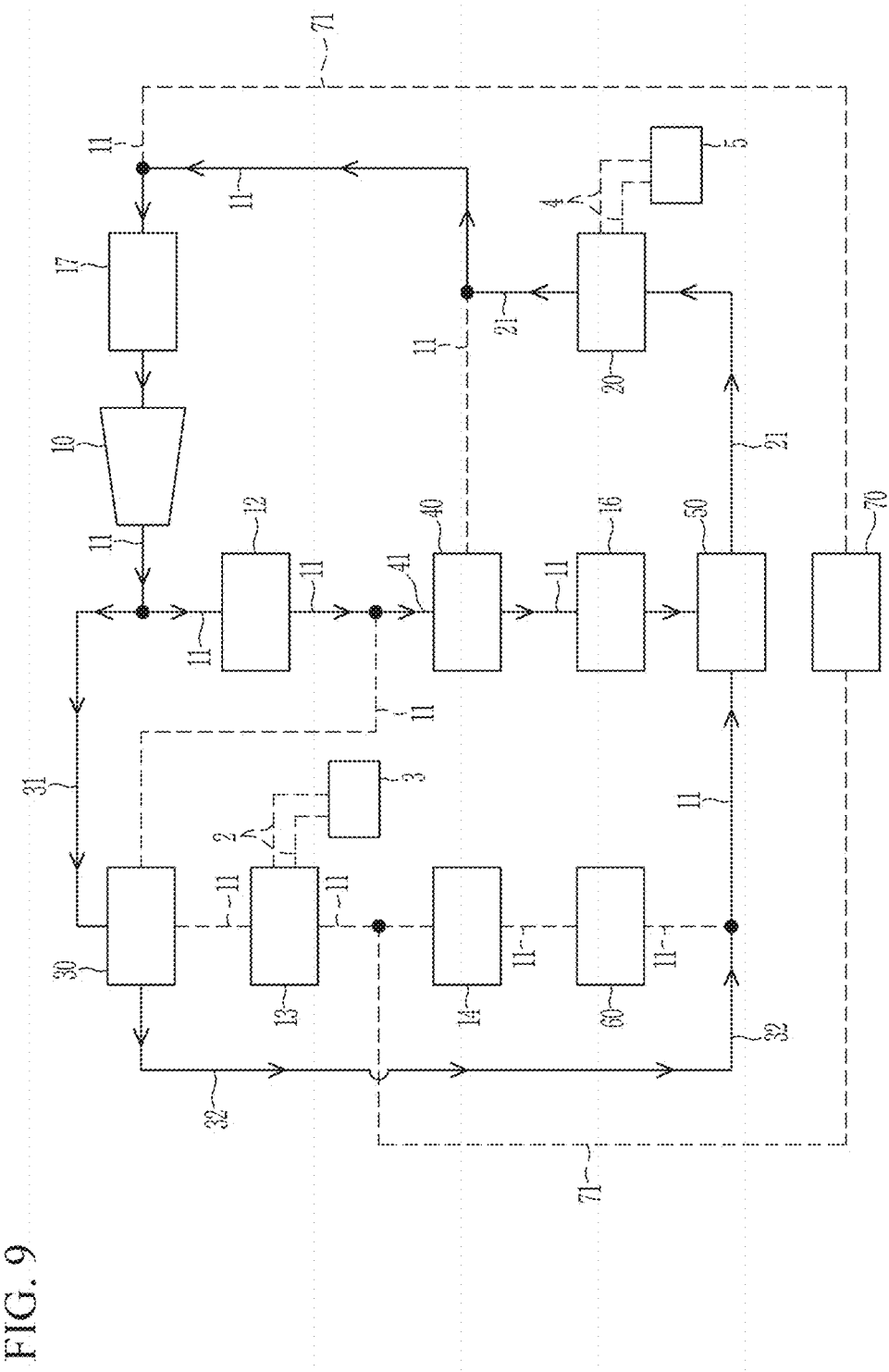
FIG. 9 is an operation diagram according to a hot gas heating mode of a vehicle interior, in a heat pump system for a vehicle according to an embodiment.

FIG. 9 is an operation diagram of a heat pump system for a hot gas heating mode for a vehicle according to an embodiment.

Referring to FIG. 9, when the ambient air heat, the waste heat of the electrical component 3, and a waste heat of the battery module 5 are not sufficient, the heat pump system may not recollect the heat.

In other words, when heating of the vehicle interior is required in the case that the outside temperature is low and the amount of heat generated by the electrical component 3 and the battery module 5 is not sufficient at the early stage of the vehicle's driving, the heat pump system may directly use the refrigerant of the high pressure and temperature to perform heating of the vehicle interior.

As such, heating the vehicle interior by using only the refrigerant may be referred to as the hot gas heating mode.

In the present embodiment, in the hot gas heating mode of the vehicle interior, the refrigerant line 11 connecting the first heat-exchanger 12 and the first control apparatus 30 is closed by the operation of the first control apparatus 30.

Simultaneously, the refrigerant line 11 connecting the first control apparatus 30, the second heat-exchanger 13, the third heat-exchanger 14, and the fourth control apparatus 60 may be closed by the first control apparatus 30 and the operation of the fourth control apparatus 60.

Accordingly, the coolant may not circulate through the first line 2.

In other words, since the waste heat of the electrical component 3 and the ambient air heat are not sufficient, the refrigerant does not flow through the second heat-exchanger 13 and the third heat-exchanger 14.

In the present embodiment, the first connection line 21 may be opened by the operation of the third control apparatus 50. The second connection line 31 is opened by the operation of the first control apparatus 30.

The third connection line 32 is opened by the operation of the first control apparatus 30.

Accordingly, some refrigerant among the refrigerant supplied from the compressor 10 may be introduced into the first heat-exchanger 12 along the refrigerant line 11.

In addition, a remaining refrigerant among the refrigerant supplied from the compressor 10 is introduced into the first control apparatus 30 along the second connection line 31.

The first control apparatus 30 may expand the refrigerant supplied from the compressor 10 through the second connection line 31 and may flow the expanded refrigerant to the third connection line 32.

A portion of the refrigerant line 11 connecting the third connection line 32 and the third control apparatus 50 may be opened by the operation of the third control apparatus 50.

The third control apparatus 50 may expand the refrigerant introduced from the fourth heat-exchanger 16 along the refrigerant line 11.

Then, the third control apparatus 50 may discharge the expanded refrigerant to the first connection line 21 together with the refrigerant introduced from the first control apparatus 30 along the third connection line 32.

In other words, the refrigerant expanded in the third control apparatus 50 may flow into the chiller 20 through the first connection line 21 in a state mixed with the refrigerant introduced from the first control apparatus 30 along the third connection line 32.

The fourth connection line 41 is opened by the operation of the second control apparatus 40.

Simultaneously, a portion of the refrigerant line 11 connecting the second control apparatus 40 and the first connection line 21 may be closed by the operation of the second control apparatus 40.

The second control apparatus 40 may flow the refrigerant supplied from the first heat-exchanger 12 through the fourth connection line 41 to the fourth heat-exchanger 16 without expansion.

In addition, the fifth connection line 71 is closed by the operation of the fifth control apparatus 70.

Accordingly, some refrigerant among the refrigerant compressed in the compressor 10 is introduced into the first heat-exchanger 12 along the refrigerant line 11. The refrigerant having passed through the first heat-exchanger 12 passes through the second control apparatus 40 along the fourth connection line 41, and then flows into the fourth heat-exchanger 16.

The first heat-exchanger 12 and the fourth heat-exchanger 16 may cool the refrigerant by heat-exchanging the air introduced into the HVAC module with the refrigerant. The refrigerant primarily cooled at the first heat-exchanger 12 may be further cooled at the fourth heat-exchanger 16.

The refrigerant supplied to the first heat-exchanger 12 and the fourth heat-exchanger 16 may increase the temperature of the air introduced into the HVAC module.

Accordingly, the air introduced from the outside may be converted to a high temperature state while sequentially passing through the fourth heat-exchanger 16 and the first heat-exchanger 12, and flow into the vehicle interior, thereby achieving the heating of the vehicle interior.

A remaining refrigerant among the refrigerant compressed in the compressor 10 is introduced into the first control apparatus 30 along the second connection line 31. The first control apparatus 30 may expand the introduced refrigerant and discharge the expanded refrigerant through the third connection line 32.

The refrigerant flowing along the third connection line 32 flows to the third control apparatus 50 through the opened refrigerant line 11.

The refrigerant introduced from the fourth heat-exchanger 16 is expanded by the operation of the third control apparatus 50.

The expanded refrigerant may be introduced into the chiller 20 along the first connection line 21, in a state mixed with the refrigerant introduced through the third connection line 32.

The refrigerant having passed through the chiller 20 is introduced into the accumulator 17 along the refrigerant line 11. Thereafter, the refrigerant may be introduced into the compressor 10 by passing through the accumulator 17.

When dehumidification is required while the hot gas heating mode of the vehicle interior is being operated, the second control apparatus 40 may expand the refrigerant having passed through the first heat-exchanger 12 and supply the expanded refrigerant to the fourth heat-exchanger 16.

Then, air introduced into the HVAC module is dehumidified by the refrigerant in the low temperature state introduced into the fourth heat-exchanger 16 while passing through the fourth heat-exchanger 16. Thereafter, as the air may be converted to a high temperature state while passing through the first heat-exchanger 12 and flow into the vehicle interior, the vehicle interior may be smoothly heated and dehumidified.

In other words, in the present embodiment, while the outside temperature is low, when the heat source is not sufficient at the early stage of the vehicle's driving, the vehicle interior may be heated by using the high temperature refrigerant supplied from the compressor 10.

Therefore, as described above, when a heat pump system for a vehicle according to an embodiment is applied, since cooling or heating of a vehicle interior is performed by using natural refrigerant, it is possible to respond to environmental regulations and the overall marketability of the vehicle may be improved.

In addition, according to the disclosure, by applying the R744 refrigerant that is a natural refrigerant using carbon dioxide, cooling and heating performance may be maximized by being operated in a super-critical region. The super-critical region is a state in which pressure and temperature of the refrigerant are higher than the threshold pressure and temperature, for cooling and heating of the vehicle interior.

In addition, according to the disclosure, the temperature of the battery module 5 is efficiently adjusted by using a single chiller 20 heat-exchanging the coolant and refrigerant depending on the vehicle mode, and thereby streamlining and simplifying the system.

In addition, according to an embodiment, by efficiently adjusting the temperature of the battery module 5, the optimal performance of the battery module 5 may be enabled, and the overall travel distance of the vehicle may be increased due to the efficient management of the battery module 5.

In addition, in the heating mode of the vehicle interior, according to the disclosure, since the expanded refrigerant is branched by the operation of the first control apparatus 30 and the fourth control apparatus 60 and supplied to the second and third heat-exchangers 13 and 14, it becomes easy to control the flow of the refrigerant, smoothly recollect the ambient air heat and the waste heat of the electrical component 3, and, at the same time, optimally design the chiller 20 for cooling of the battery module 5.

In addition, according to an embodiment, it is possible to reduce manufacturing cost and weight through simplification of an entire system and to improve space utilization.

While this disclosure has been described in connection with what is presently considered to be practical embodiments, it should be understood that the disclosure is not limited to the disclosed embodiments. On the contrary, the disclosure is intended to cover various modifications and equivalent arrangements included within the spirit and scope of the appended claims.

DESCRIPTION OF SYMBOLS 2, 4: first and second lines
3: electrical component
5: battery module
10: compressor
11: refrigerant line
12, 13, 14, 16: first, second, third, and fourth heat-exchangers
17: accumulator
20: chiller
21: first connection line
30: first control apparatus
31: second connection line
32: third connection line
40: second control apparatus
41: fourth connection line
50: third control apparatus
60: fourth control apparatus
70: fifth control apparatus
71: fifth connection line

What is claimed is:

1. A heat pump system for a vehicle, comprising:
   an air conditioner unit including a compressor, a first heat-exchanger, a second heat-exchanger, a third heat-exchanger, and a fourth heat-exchanger that are connected through a refrigerant line so as to circulate a refrigerant through the refrigerant line; and
   a chiller connected to the refrigerant line through a first connection line, and configured to exchange heat between the refrigerant supplied from the air conditioner unit with a coolant to adjust a temperature of the coolant,
   wherein the air conditioner unit further includes
      a second connection line having a first end connected to the refrigerant line between the compressor and the first heat-exchanger and a second end connected to the refrigerant line between the first heat-exchanger and the second heat-exchanger,
      a third connection line having a first end connected to the refrigerant line between the first heat-exchanger and the second heat-exchanger and a second end connected to the refrigerant line between the third heat-exchanger and the fourth heat-exchanger,
      a first control apparatus provided in the refrigerant line between the first heat-exchanger and the second heat-exchanger, connected to the second connection line and the third connection line, respectively, and configured to control a flow of the refrigerant,
      a second control apparatus provided in the refrigerant line between the fourth heat-exchanger and the compressor,
      a third control apparatus provided in the refrigerant line between the third heat-exchanger and the fourth heat-exchanger, and configured to control flowing of the refrigerant and selectively expand the refrigerant, and
      a fourth connection line having a first end connected to the refrigerant line between the first heat-exchanger and the first control apparatus and a second end connected to the second control apparatus.

2. The heat pump system of claim 1, wherein the first control apparatus comprises:
   a first valve provided in the refrigerant line between the first heat-exchanger and the second heat-exchanger;
   a second valve provided in the second connection line; and
   a first expansion valve provided in the third connection line.

3. The heat pump system of claim 1, wherein the second control apparatus comprises:
   a third valve provided in the refrigerant line between the fourth heat-exchanger and the compressor; and
   a second expansion valve provided in the fourth connection line.

4. The heat pump system of claim 1, wherein the third control apparatus comprises:
   a third expansion valve provided in the refrigerant line between the third heat-exchanger and the fourth heat-exchanger; and
   a fourth expansion valve provided in the first connection line upstream of the chiller.

5. The heat pump system of claim 1, wherein:
   a first end of the first connection line is connected to the refrigerant line between the compressor and the fourth heat-exchanger; and
   a second end of the first connection line is connected to the third control apparatus.

6. The heat pump system of claim 1, wherein the air conditioner unit further comprises:
   a fourth control apparatus provided in the refrigerant line between the third heat-exchanger and the third control apparatus;
   a fifth connection line having a first end connected to the refrigerant line between the second heat-exchanger and the third heat-exchanger and a second end connected to the refrigerant line between the fourth heat-exchanger and the compressor; and
   a fifth control apparatus provided in the fifth connection line.

7. The heat pump system of claim 6, wherein, in a cooling mode of the vehicle interior:
   the refrigerant line connecting the compressor and the first heat-exchanger, and the refrigerant line connecting the first heat-exchanger and the first control apparatus are closed by an operation of the first control apparatus;
   the refrigerant line connecting the third heat-exchanger and the third control apparatus is opened by an operation of the fourth control apparatus;
   the second connection line is opened by the operation of the first control apparatus such that the compressor and the second heat-exchanger are connected;
   the third connection line is closed by the operation of the first control apparatus;
   the fourth connection line is closed by an operation of the second control apparatus; and
   the fifth connection line is closed by an operation of the fifth control apparatus.

8. The heat pump system of claim 7, wherein, in the cooling mode of the vehicle interior, when cooling of a battery module is required, the first connection line is opened by an operation of the third control apparatus.

9. The heat pump system of claim 8, wherein the third control apparatus is configured to:
   expand the refrigerant introduced into the first connection line and flow the expanded refrigerant to the chiller such that the battery module is cooled by using the coolant having exchange heat with the refrigerant in the chiller; and
   expand the refrigerant introduced into the refrigerant line and flow the expanded refrigerant to the fourth heat-exchanger such that the expanded refrigerant may be introduced into the fourth heat-exchanger.

10. The heat pump system of claim 6, wherein, in a heating mode of the vehicle interior:
    the refrigerant line connecting the first heat-exchanger and the first control apparatus is closed by an operation of the first control apparatus;
    the first connection line is closed by an operation of the third control apparatus;
    the second connection line is closed by the operation of the first control apparatus;
    the third connection line is opened by the operation of the first control apparatus;
    the fourth connection line is opened by an operation of the second control apparatus;
    the fifth connection line is opened by an operation of the fifth control apparatus; and
    a portion of the refrigerant line connecting the second control apparatus and the compressor is closed by the operation of the second control apparatus.

11. The heat pump system of claim 10, wherein the third control apparatus is configured to expand the refrigerant introduced from the fourth heat-exchanger and flow the expanded refrigerant to the refrigerant line.

12. The heat pump system of claim 10, wherein:
the third control apparatus is configured to flow the refrigerant introduced from the fourth heat-exchanger to the refrigerant line; and
the fourth control apparatus is configured to expand the refrigerant introduced through the refrigerant line and introduce the expanded refrigerant into the third heat-exchanger.

13. The heat pump system of claim 12, wherein the first control apparatus is configured to expand the refrigerant introduced through the third connection line and introduce the expanded refrigerant into the second heat-exchanger.

14. The heat pump system of claim 10, wherein:
a portion of the refrigerant among the refrigerant introduced from the third control apparatus into the refrigerant line is introduced into the third heat-exchanger along the refrigerant line opened by an operation of the fourth control apparatus; and
a remaining portion of the refrigerant among the refrigerant introduced from the third control apparatus into the refrigerant line is introduced into the second heat-exchanger along the third connection line by an operation of the first control apparatus.

15. The heat pump system of claim 10, wherein the refrigerant discharged from the second heat-exchanger and the third heat-exchanger is supplied to the compressor along the opened fifth connection line and the refrigerant line connecting the fifth connection line and the compressor.

16. The heat pump system of claim 6, wherein, in a hot gas heating mode of the vehicle interior:
the refrigerant line connecting the first heat-exchanger and the first control apparatus is closed by an operation of the first control apparatus;
the first connection line is opened by an operation of the third control apparatus;
the second connection line is opened by the operation of the first control apparatus;
the third connection line is opened by the operation of the first control apparatus;
the fourth connection line is opened by an operation of the second control apparatus;
the fifth connection line is closed by an operation of the fifth control apparatus;
the refrigerant line connecting the first control apparatus, the second heat-exchanger, the third heat-exchanger, and the fourth control apparatus is closed by the operation of the first control apparatus and an operation of the fourth control apparatus;
a portion of the refrigerant line connecting the second control apparatus and the first connection line is closed by the operation of the second control apparatus; and
a portion of the refrigerant line connecting the third connection line and the third control apparatus is opened by the operation of the third control apparatus.

17. The heat pump system of claim 16, wherein the first control apparatus is configured to expand the refrigerant supplied from the compressor through the second connection line and flow the expanded refrigerant to the third connection line.

18. The heat pump system of claim 16, wherein:
the second control apparatus is configured to flow the refrigerant supplied from the first heat-exchanger through the fourth connection line to the fourth heat-exchanger; and
the third control apparatus is configured to expand the refrigerant introduced from the fourth heat-exchanger along the refrigerant line and to flow the expanded refrigerant to the chiller through the first connection line together with the refrigerant introduced from the first control apparatus through the third connection line.

19. The heat pump system of claim 1, wherein the second heat-exchanger, the third heat-exchanger, and the fourth heat-exchanger are configured to cool or evaporate the refrigerant according to selective operations of the first control apparatus, the second control apparatus, or the third control apparatus.

20. The heat pump system of claim 1, wherein the refrigerant is R744 refrigerant formed of carbon dioxide.

* * * * *